(12) United States Patent
Banerjee et al.

(10) Patent No.: US 9,707,962 B2
(45) Date of Patent: Jul. 18, 2017

(54) METHOD FOR ANTICIPATORY CONTROLLING A CRUISE CONTROL OF A MOTOR VEHICLE

(71) Applicant: ZF Friedrichshafen AG, Friedrichshafen (DE)

(72) Inventors: Alexander Banerjee, Oberteuringen (DE); Martin Sperlich, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 9 days.

(21) Appl. No.: 14/793,084

(22) Filed: Jul. 7, 2015

(65) Prior Publication Data

US 2016/0016586 A1    Jan. 21, 2016

(30) Foreign Application Priority Data

Jul. 21, 2014  (DE) .................. 10 2014 214 140

(51) Int. Cl.
*B60W 30/14*    (2006.01)
*B60W 50/00*    (2006.01)

(52) U.S. Cl.
CPC .......... *B60W 30/143* (2013.01); *B60W 30/14* (2013.01); *B60W 50/0097* (2013.01);
(Continued)

(58) Field of Classification Search
CPC .. B60W 3/143; B60W 50/0097; B60W 30/14; B60W 2550/143; B60W 2550/402; B60W 2720/30; B60W 30/16–30/162; B60W 40/076; B60W 2050/0026; B60W 2550/142; B60W 2720/10; B60W 2720/103; Y02T 10/84
(Continued)

(56) References Cited

U.S. PATENT DOCUMENTS 6,076,036 A *  6/2000  Price .................... B60K 31/047
                                                       180/170
8,615,352 B2 * 12/2013 Maruyama ............ B60W 30/17
                                                         701/93
(Continued)

FOREIGN PATENT DOCUMENTS

DE    10 2008 038 078 A1    5/2009
DE    10 2009 040 682 A1    3/2011
DE    10 2011 121 853 A1    6/2012

OTHER PUBLICATIONS

German Search Report Corresponding to 10 2014 214 140.0 mailed Feb. 27, 2015.

*Primary Examiner* — Bao Long T Nguyen
(74) *Attorney, Agent, or Firm* — Davis & Bujold, PLLC; Michael J. Bujold

(57) ABSTRACT

A method for predictive control of a cruise control system of a motor vehicle in which a selection is made from a variety of control variants in order to set a target speed with respect to a stretch of road ahead. In so doing, the selection is made as a function of a gradient profile of the stretch of road ahead. In order to now implement an optimum predictive control with respect to fuel consumption with low complexity, the gradient profile is segmented through allocation to gradient ranges, which are determined as a function of the target speed. A respectively suitable control variant is then selected on the basis of at least one segment of the gradient profile.

9 Claims, 2 Drawing Sheets

(52) U.S. Cl.
CPC . *B60W 2550/142* (2013.01); *B60W 2550/143* (2013.01); *B60W 2550/402* (2013.01); *B60W 2720/10* (2013.01); *B60W 2720/103* (2013.01); *B60W 2720/30* (2013.01); *Y02T 10/84* (2013.01)

(58) Field of Classification Search
USPC ............................................. 701/93, 94, 98
See application file for complete search history.

(56) References Cited

U.S. PATENT DOCUMENTS

| | | | | |
|---|---|---|---|---|
| 2003/0074124 | A1* | 4/2003 | Ono | B60K 31/04 701/70 |
| 2004/0068359 | A1* | 4/2004 | Neiss | B60K 31/0058 701/96 |
| 2011/0276216 | A1* | 11/2011 | Vaughan | B60W 10/06 701/31.4 |
| 2014/0074370 | A1* | 3/2014 | Johansson | B60W 50/0097 701/93 |
| 2014/0244067 | A1* | 8/2014 | Filev | G06F 17/00 701/1 |
| 2014/0244130 | A1* | 8/2014 | Filev | B60K 31/00 701/96 |
| 2015/0134224 | A1* | 5/2015 | Vaughan | B60W 30/143 701/93 |
| 2015/0165905 | A1* | 6/2015 | Filev | B60K 31/00 701/94 |
| 2015/0197247 | A1* | 7/2015 | Ichinokawa | B60W 30/143 701/93 |
| 2015/0217766 | A1* | 8/2015 | Kelly | B60W 30/143 701/94 |
| 2015/0217767 | A1* | 8/2015 | Kelly | B60K 28/16 701/93 |
| 2015/0306957 | A1* | 10/2015 | Sujan | B60K 31/00 701/94 |
| 2016/0101780 | A1* | 4/2016 | Park | B60W 50/0097 701/70 |

* cited by examiner

METHOD FOR ANTICIPATORY CONTROLLING A CRUISE CONTROL OF A MOTOR VEHICLE

This application claims priority from German patent application serial no. 10 2014 214 140.0 filed Jul. 21, 2014.

FIELD OF THE INVENTION

The invention relates to a method for predictive control of a cruise control system of a motor vehicle, wherein a selection is made from a variety of control variants in order to set a target speed with respect to a stretch of road ahead, and wherein the selection is made as a function of a gradient profile of the stretch of road ahead.

BACKGROUND OF THE INVENTION

Cruise control systems are used in motor vehicles in order to automatically regulate a target speed that has been preset by the vehicle driver as far as possible, especially on long stretches of road, so that, with the exception of any temporary braking maneuvers that must be performed, the vehicle driver only needs to make steering movements. While in classic cruise control systems, during normal operation, state variables of the respective motor vehicle are used in order to automatically adjust the speed in accordance with the respective desired speed, and in so doing, to remain within a predefined speed band, in the modern control of cruise control systems, information concerning a stretch of road ahead is also used, in part, in order to make predictive control possible. In so doing, a gradient profile for the stretch of road ahead is frequently taken into consideration in order to be able to drive incline grades in the stretch of road ahead in an optimal manner, in particular with respect to economic and ecological factors, in the course of automatic speed control.

A method for predictive control of a cruise control system of a motor vehicle arises from DE 10 2009 040 682 A1. Here, roadway parameters for a stretch of road ahead, which include a gradient profile for this stretch of road ahead, inter alia, are factored in. Based on the roadway parameters as well as current vehicle parameters, a selection is then made from a variety of control variants of the cruise control system, wherein, in so doing, an approximate predictive horizon is determined, which is subsequently subdivided into segments based on the gradient. The influence of a respectively selected control variant, as well as the suitability of the variant for the need-based control of the cruise control system, is then checked for each segment for one or a plurality of applications.

SUMMARY OF THE INVENTION

Starting from the above-described prior art, the object of the present invention is to create a method, with which it is possible to implement optimum, predictive control with respect to fuel consumption with low complexity.

This object is achieved on the basis of the characterizing features and advantageous developments of the invention described below. In addition, a control system of a motor vehicle, which comprises a cruise control system that can be controlled according to the invention, proceeds from the following description which also describes a computer program product, as well as to a storage medium, which contains the computer program product.

According to the invention, in the case of a method for predictive control of a cruise control system of a motor vehicle, a selection is made from a variety of control variants in order to set a target speed with respect to a stretch of road ahead. In so doing, the selection is made as a function of a gradient profile of the stretch of road ahead. As such, for the purposes of the invention, the control variants preferably exist in the form of specific action recommendations, i.e., a specific operational mode of a drive train of the motor vehicle is predefined within the context of each selected control variant. As such, it is particularly preferred that the operating point of a drive motor be set by selecting a specific shift strategy of a motor vehicle transmission.

According to the invention, the gradient profile of the stretch of road ahead is determined, in particular, by means of predictive software, which evaluates data from a navigation device of the motor vehicle. If the vehicle driver is guided to a specific destination with the help of the navigation device, the gradient profile of the planned route is directly factored in. On the other hand, if no navigation is performed using the navigation device, a route is determined, in particular, as a most likely path, in which, in the case of a plurality of alternative possibilities, an additional route corresponding to the driving style of the vehicle driver is suggested as the most likely driving route. In so doing, it is especially preferred that a segment of road ahead that falls in the range of 7 kilometers be taken into account as the stretch of road ahead, whereby on the one hand, a reliable control of the cruise control system can be carried out, while on the other hand, the amount of data to be taken into account is minimized.

The invention now comprises the technical teaching that the gradient profile is segmented through allocation to gradient ranges, which are determined as a function of the target speed, and that a respectively suitable variant of the control variants is selected on the basis of at least one segment of the gradient profile. In other words, the gradient profile of the stretch of road ahead is thus classified through allocation to gradient ranges, wherein these gradient ranges have been determined as a function of the desired target speed. As such, the gradient profile is subdivided into one or a plurality of segments by allocating the profile to these ranges, depending on the course thereof, wherein, in the case of a division into a single segment, the gradient profile is represented entirely by this single segment. At least one segment is used in selecting from the different control variants, and a specific control variant is selected on the basis of the segment or simply the plurality of segments.

An optimum trajectory of the target speed setpoint can be determined in advance by means of such a method of controlling a cruise control system, wherein this determination can be made in the course of a few single steps, and thus, with low complexity. This is because it is essentially only the allocation of the gradient profile to various gradient ranges that must be carried out for the selection. Overall, predictive control of a cruise control system can be implemented in this manner, which makes it possible to drive a stretch of road ahead in a fuel-optimized manner.

The method from DE 10 2009 040 682 A1 is comparatively more complex, since in the case of this method, an approximate predictive horizon is initially determined, which is then subsequently subdivided into more precise segments. Since it is also necessary to verify for each segment whether a need-based control can be achieved in one or a plurality of applications and in a respectively selected control variant, and since simulations must thus be carried out in each case, a corresponding computational effort is needed.

For the purposes of the invention, a segment of the gradient profile is preferably formed in such a way that the gradient profile falls completely within one of the gradient ranges, and thus is delimited by two transitions between ranges or, respectively, in the case of a first segment, the progression from the start of the calculation to a first change in gradient ranges.

According to one embodiment of the invention, the allocation is made to four gradient ranges. As such, a first gradient range represents road incline grades, in which the target speed setpoint can no longer be maintained even when the drive motor of the motor vehicle is under full load, while road incline grades, in which the target speed setpoint can be achieved when the drive motor is in traction mode, thus when the motor is operating under full load, or even under partial load, are allocated to a second gradient range. A third gradient range then represents road incline grades, in which the target speed can be maintained or even increases when the motor vehicle is in overrun mode, while road incline grades, in which the target speed can be achieved or even increases when the drive motor is in coasting mode, are allocated to a fourth gradient range.

Such a subdivision of conceivable road incline grades makes it possible to suitably select from among control variants by allocating the gradient profile of the stretch of road ahead to the gradient ranges. It is particularly preferred that, in so doing, the gradient ranges have been determined in advance by calculating threshold gradients between the ranges, wherein this is done with the help of the driving resistance equation and a maximum and minimum motor torque of the drive motor, taking into account the target speed setpoint. In so doing, a vehicle mass, which is known from specific weighing or by estimation, for example, as well as a substantially constant rolling resistance on the stretch of road ahead are assumed.

In a further development of the invention, an average incline grade within a respective segment of the gradient profile is determined, as a result of which it is possible to further simplify the method, and thus to reduce the complexity.

According to a further possible design of the invention, when determining three or more segments of the gradient profile for the stretch of road ahead, the first three consecutive segments are used in order to determine the respectively suitable control variant. The use of three consecutive segments makes it possible to determine a pattern, on the basis of which a decision can be made to select one of the control variants. In allocating the gradient profile to four gradient ranges, the respectively suitable control variant is thereby preferably selected from a stored 4×4×4 matrix. As such, a 4×4×4 matrix is preferably generated by the sample tables depicted in the following, each of which allocates each starting segment to each of the four gradient ranges:

|   | 1 | 2 | 3 | 4 |
|---|---|---|---|---|
| Starting segment 1 | | | | |
| 1 | 0 | 0 | 0 | 0 |
| 2 | Highest possible speed after segment 1 by driving under full load | 0 | Reduction of speed to $V_{min}$ after segment 1 by driving under full load or partial load | Reduction of speed to $V_{min}$ after segment 1 by driving under full load or partial load |
| 3 | Highest possible speed after segment 1 by driving under full load | Reduction of speed to $V_{min}$ after segment 1 by driving under full load or partial load | 0 | Reduction of speed to $V_{min}$ after segment 1 by driving under full load or partial load |
| 4 | Reduction of speed to $V_{min}$ after segment 1 by driving under full load or partial load | Reduction of speed to $V_{min}$ after segment 1 by driving under full load or partial load | Reduction of speed to $V_{min}$ after segment 1 by driving under full load or partial load | 0 |
| Starting segment 2 | | | | |
| 1 | 0 | Acceleration to $V_{max}$ in segment 1 by driving under full load or partial load | Acceleration by driving under full load or partial load in the first segment, so that $V_{min}$ is reached after the second segment by driving under full load | Acceleration by driving under full load or partial load in the first segment, so that $V_{min}$ is reached after the second segment by driving under full load |
| 2 | 0 | 0 | 0 | 0 |
| 3 | Driving under full load, partial load or in overrun mode in the first segment, so that $V_{max}$ is reached after the second segment by driving in overrun mode | Reduction to $V_{min}$ in segment 1 by driving under partial load, in overrun mode or coasting modl | 0 | Driving at $V_{ref}$ in segment 1 by driving under partial load |
| 4 | Driving under full load, partial load or in overrun mode in the first segment, so that $V_{max}$ is reached after the second segment by driving in coasting mode | Driving under full load, partial load or in overrun mode in the first segment, so that $V_{max}$ is reached after the second segment by driving in coasting mode | Reduction to $V_{min}$ after segment 1 by driving under partial load, in overrun mode or coasting mode | 0 |
| Starting segment 3 | | | | |
| 1 | 0 | Increase to $V_{max}$ in segment 1 by driving under full load, partial load or in overrun mode | Increase to $V_{max}$ in segment 1 by driving under full load, partial load or in overrun mode | Increase to $V_{max}$ in segment 1 by driving under full load, partial load or in overrun mode |

|   | 1 | 2 | 3 | 4 |
|---|---|---|---|---|
| 2 | In overrun mode in segment 1 | 0 | In overrun mode in segment 1 | In overrun mode in segment 1 |
| 3 | 5 | 0 | 0 | 0 |
| 4 | Reaching V by coasting mode or in overrun mode in segment 1, so that $V_{max}$ is reached through coasting mode after segment 2 | Reaching V by coasting mode or in overrun mode in segment 1, so that $V_{max}$ is reached through coasting mode after segment 2 | Reaching V by coasting mode or in overrun mode in segment 1, so that $V_{max}$ is reached through coasting mode after segment 2 | 0 |
| Starting segment 4 | | | | |
| 1 | 0 | Increase to $V_{max}$ in segment 1 by driving under full load, partial load, in overrun mode or coasting mode | Increase to $V_{max}$ in segment 1 by driving under full load, partial load, in overrun mode or coasting mode | Increase to $V_{max}$ in segment 1 by driving under full load, partial load, in overrun mode or coasting mode |
| 2 | Increase to $V_{max}$ in segment 1 by driving under full load, partial load, in overrun mode or coasting mode | 0 | Increase to $V_{max}$ in segment 1 by driving under full load, partial load, in overrun mode or coasting mode | Increase to $V_{max}$ in segment 1 by driving under full load, partial load, in overrun mode or coasting mode |
| 3 | Driving in coasting mode in segment 1 | Driving in coasting mode in segment 1 | 0 | Driving in coasting mode in segment 1 |
| 4 | 0 | 0 | 0 | 0 |

In each table, the vertical axis corresponds to the range of the respective second segment, and the horizontal axis corresponds to the respective third segment. As such, a respective specific action recommendation can be selected with the help of the three consecutive segments.

For the purpose of the invention, when determining fewer than three segments of the gradient profile for the stretch of road ahead, a respectively suitable control variant is selected on the basis of the one segment, or on the basis of the two consecutive segments. Thus, if there are only one or two consecutive segments of the gradient profile in the range of the predictive horizon, for example because the gradient profile does not change substantially within the range of the horizon or, respectively, the profile consistently remains in one gradient range, a suitable control variant can nevertheless be selected. It is particularly preferable that this be done by selecting a control variant from a stored table. The following table, for example, could be used to detect two consecutive segments, or in the event that only a single segment is detected:

|   | 1 | 2 | 3 | 4 |
|---|---|---|---|---|
| 1 | 0 | Driving under full load in segment 1 | Reduction to $V_{min}$ by driving under full load, partial load, in overrun mode or | Reduction to $V_{min}$ by driving under full load, partial load, in overrun mode or |
| 2 | Acceleration to $V_{max}$ in segment 1 by driving under full load or partial load | 0 | Reduction to $V_{min}$ by driving under full load, partial load, in overrun mode or | Reduction to $V_{min}$ by driving under full load, partial load, in overrun mode or |
| 3 | Acceleration to $V_{max}$ in segment 1 by driving under full load, partial load or in | Driving in overrun mode in segment 1 | 0 | Reduction to $V_{min}$ by driving under full load, partial load, in overrun mode or |
| 4 | Acceleration to $V_{max}$ in segment 1 by driving under full load, partial load, in | Driving in coasting mode in segment 1 | Reduction to $V_{min}$ by driving under full load, partial load, in overrun mode or | 0 |

Here, the vertical axis corresponds to the region of the respective first segment, and the horizontal axis corresponds to the region of the respective second segment.

1 Driving under full load
2 Maintaining $V_{ref}$ by driving under partial load
3 Acceleration to $V_{max}$ with overrun mode, subsequent maintenance of speed using coasting mode
4 Acceleration to $V_{max}$ with coasting mode, subsequent maintenance of speed In a further development of the invention, after a first segment or the single segment has been passed through, the gradient profile is updated and segmentation is performed again. In this way, it is possible to constantly update the horizon, which is the basis for the predictive adjustment of the target speed and thus, in order to guarantee that a suitable control variant will be selected.

In so doing, the method according to the invention is carried out, in particular, by a control system of a motor vehicle, wherein the control system includes the cruise control system that is to be controlled. As such, the solution according to the invention may also be embodied as a computer program product, which uses software commands to instruct the processor to carry out the assigned process steps according to the invention when this program is running on a processor of a control device, such as a transmission control module. Within this context, a computer-readable medium, on which an above-described computer program product is stored, is also the subject matter of the invention.

The invention is not limited to the specified combination of the independent claims, or the claims that are dependent thereon. In addition, it is also possible to combine individual features with one another insofar as these features arise from the claims, the following description of a preferred embodiment of the invention, or directly from the drawings. The reference of the claims to the drawings through the use of reference characters is not intended to limit the scope of protection of the claims.

BRIEF DESCRIPTION OF THE DRAWINGS

Depicted in the drawings is an advantageous embodiment of the invention, which is explained in the following. Shown are.

DETAILED DESCRIPTION OF THE PREFERRED EMBODIMENTS

Figure 1:
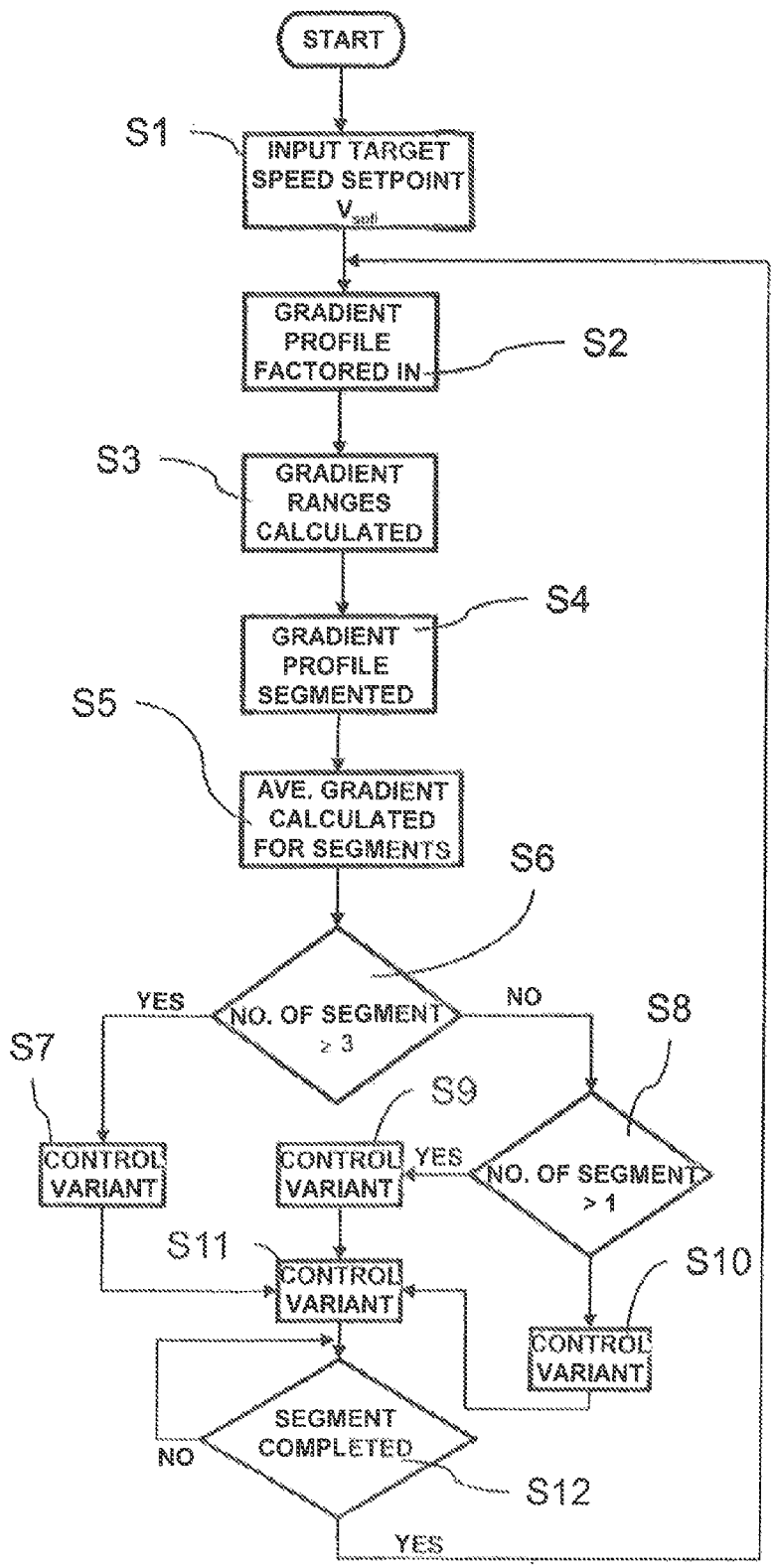
FIG. 1 a flow chart of a method for controlling a cruise control system of a motor vehicle according to a preferred embodiment of the invention.

FIG. 1 shows a flow chart of a method for the predictive control of a cruise control system of a motor vehicle according to a preferred embodiment of the invention. Here, a target speed $V_{soil}$ is set with respect to a stretch of road ahead with the help of this method, wherein this target speed setpoint $V_{soil}$ is input in a first step S1. A gradient profile of the stretch of road ahead is subsequently factored in, in a step S2, wherein this is preferably done with the help of predictive software by retrieving the corresponding parameters from a navigation device. In so doing, the respective gradient profile of the planned driving route can be used in the case of navigation using this navigation device, while in the case that no guidance using the navigation device is planned, a probable driving route is determined using a most-likely-path calculation model. The diagram in FIG. 2 shows an exemplary gradient profile.

In a further step S3, four different gradient ranges are calculated on the basis of the target speed setpoint $V_{soil}$ with the help of the driving resistance equation and the known maximum and minimum motor torque of a drive motor of the motor vehicle, from among which, a first gradient range 1 represents road incline grades, in which the target speed $V_{soil}$ can no longer be maintained, even when the drive motor is operating under full load. A subsequent, second gradient range 2, on the other hand, represents road incline grades, in which the target speed $V_{soil}$ can be achieved when the drive motor is in traction mode, thus it is possible to drive at the target speed $V_{soil}$ while operating under partial load or full load. Moreover, road incline grades, in which the target speed $V_{soil}$ can be maintained or even increases when the motor vehicle is operating in overrun mode, i.e., the drive motor is declutched, are allocated to a third gradient range 3. Finally, a fourth gradient range 4 represents road incline grades, in which the target speed is achieved or even increases when the drive motor is in coasting mode. The four gradient ranges 1 through 4 are also delineated in the diagram in FIG. 2.

Figure 2:
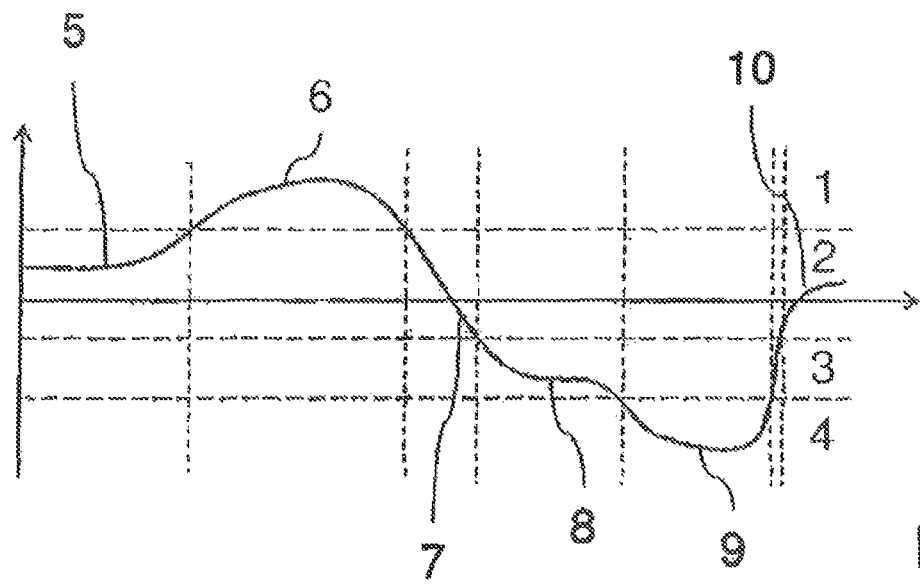
FIG. 2 a diagram of a gradient profile of a stretch of road ahead, as well as the allocation thereof to various gradient ranges in the course of the method from FIG. 1.

In a step S4, which follows step S3, the gradient profile is subdivided through allocation to the gradient ranges 1 through 4 in segments 5 through 10, as can likewise be seen in FIG. 2. In so doing, with the exception of segment 5, the segments 6 through 10 are each defined by being delimited by two transitions between ranges. In the case of segment 5, the segment is delimited by the start of the detected gradient profile to the first transition to another range.

Figure 3:
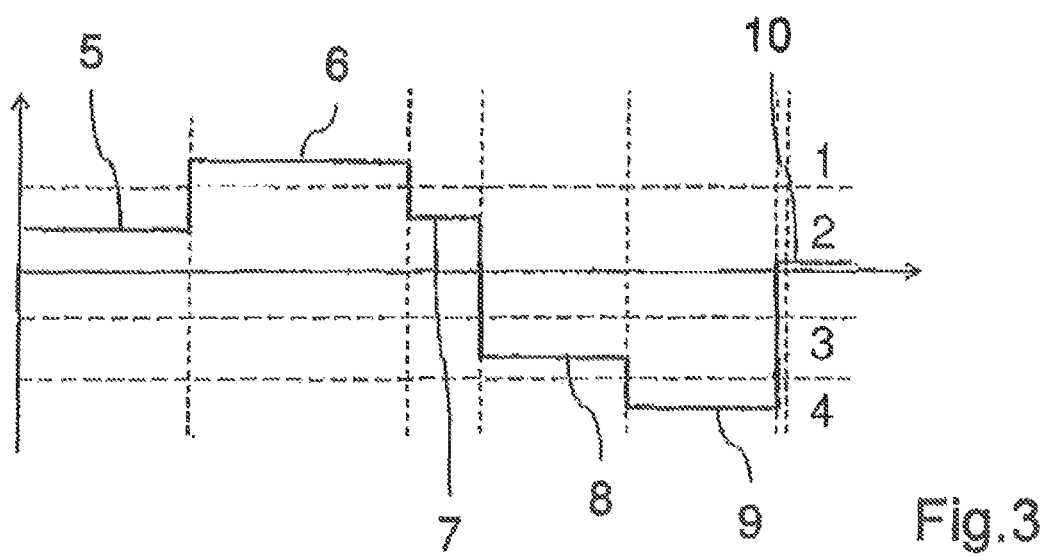
FIG. 3 a diagram of a calculated average gradient, as well as the allocation thereof to various gradient ranges in the course of the method from FIG. 1.

In a further step S5, for the sake of simplification, an average gradient is calculated from the gradients in each of the segments 5 through 10, as can be seen in the diagram in FIG. 3. In a step S6, a query is subsequently made as to whether the number of segments ≥3, wherein, if this is the case, a step S7 is initiated. If this is not the case, a query is made in a step S8 as to whether the number of segments is >1, whereupon, if this is the case, a step S9 is initiated, and if this is not the case, a step S10 is initiated.

While in steps S9 and S10, a control variant is selected from a table, as already indicated prior to the description by way of example, in step S7, a pattern is determined and a suitable control variant is selected from a stored 4×4×4 matrix on the basis of the first three consecutive segments. Here, this matrix is formed by the tables already mentioned in the preceding description, for example. In the case of the gradient curves from FIGS. 2 and 3, the segments 5, 6 and 7 are relevant in determining a pattern. As a result, in the case of the pattern to be determined, a first segment is allocated to the gradient range 2, a second segment is allocated to the first gradient range 1 and a third segment, in turn, is allocated to the second gradient range 2. Accordingly, in the case of a matrix defined by the exemplary tables, this would result in an acceleration of $V_{max}$ in the first segment by driving under full load or under partial load as a control variant.

In a step S11, which follows the steps S7, S9 and S10, this control variant is then selected and in a subsequent step S12, a query is made as to whether the first segment has already been driven through completely. If this is not the case, the process returns to the start of S12 and a query is again made, while if this is the case, the process returns to the start of step S2 and a gradient profile of the stretch of road ahead is updated. Hereafter, another control variant may be selected in the following steps S2 through S11.

Predictive control with respect to operating the motor vehicle in a fuel-efficient manner with low complexity can be achieved by means of the method according to the invention for controlling a cruise control system of a motor vehicle.

REFERENCE CHARACTERS

1 First gradient range
2 Second gradient range
3 Third gradient range
4 Fourth gradient range
5 Segment
6 Segment
7 Segment
8 Segment
9 Segment
10 Segment
$V_{soil}$ Target speed
S1 through S12 Single steps

The invention claimed is:
1. A method for predictive control of a cruise control system of a motor vehicle, and the motor vehicle having a navigation device which detects road incline data, the method comprising steps of:
receiving route parameters of a stretch of road ahead of the motor vehicle from the navigation device;
determining, via the cruise control system, a gradient profile of the stretch of road ahead based upon the route parameters received from the navigation device;

dividing, via the cruise control system, the gradient profile into a plurality of gradient ranges based on a function of a target speed of the motor vehicle;

segmenting, via the cruise control system, the gradient profile of the stretch of road ahead into sequential segments based on transitions of the gradient profile from one of the plurality of gradient ranges into another one of the plurality of gradient ranges;

selecting, via the cruise control system, a control variant based on the gradient range of a current sequential segment of the gradient profile of the stretch of road ahead to set the target speed;

operating a drive train of the motor vehicle, via the cruise control system, in a specific operational mode based on the control variant selected; and dividing the gradient profile into first, second, third and fourth gradient ranges;

the first gradient range is defined as a range of road incline grades in which the target speed is unable to be maintained even when the drive train is operating under full load;

the second gradient range is defined as a range of road incline grades in which the target speed is able to be achieved when the drive train is operating in a traction mode;

the third gradient range is defined as a range of road incline grades in which the target speed is able to be either maintained or increased when the drive train is operating in an overrun mode; and the fourth gradient range is defined as a range of road incline grades in which the target speed is able to be either achieved or increased when the drive train is operating in a coasting mode.

2. The method according to claim 1, further comprising a step of determining an average incline grade within each of the sequential segments of the gradient profile.

3. The method according to claim 1, further comprising a step of segmenting the gradient profile for the stretch of road ahead into at least first, second and third sequential segments, and using each of the first, the second and the third sequential segments to select a respective control variant.

4. The method according to claim 3, further comprising a step of selecting the respective control variant from a stored 4×4×4 matrix.

5. The method according to claim 1, further comprising a step of, when segmenting the gradient profile for the stretch of road ahead into fewer than three sequential segments, selecting the respectively suitable control variant either on a basis of the gradient range of the current sequential segment or on a basis of the gradient range of the current and subsequent sequential segments.

6. The method according to claim 1, further comprising a step of, after either a first sequential segment or a lone sequential segment has been passed through, updating the gradient profile and performing segmentation again.

7. A control system of a motor vehicle comprising a navigation device which detects road incline data and communicates with a cruise control system, the cruise control system is predicatively controllable by a method in which a selection is made from a variety of control variants in order to set a target speed with respect to a stretch of road ahead of the motor vehicle, and making the selection as a function of a gradient profile of the stretch of road ahead, the method including:

receiving route parameters of the stretch of road ahead from the navigation device;

determining, via the cruise control system of the motor vehicle, the gradient profile of the stretch of road ahead based upon the route parameters retrieved from the navigation device;

dividing, via the cruise control system, the gradient profile into a plurality of gradient ranges based on a function of a target speed of the motor vehicle;

segmenting, via the cruise control system, the gradient profile into sequential segments based on transitions of the gradient profile from one of the plurality of gradient ranges into another one of the plurality of gradient ranges;

selecting, via the cruise control system, a control variant based on a gradient range of a current sequential segment of the gradient profile of the stretch of road ahead to set the target speed;

operating, with the cruise control system of the motor vehicle, a drive train of the motor vehicle in a specific operational mode based on the selected control variant; and dividing the gradient profile into first, second, third and fourth gradient ranges;

the first gradient range is defined as a range of road incline grades in which the target speed is unable to be maintained even when the drive train is operating under full load;

the second gradient range is defined as a range of road incline grades in which the target seed is able to be achieved when the drive train is operating in a traction mode;

the third gradient range is defined as a range of road incline grades in which the target speed is able to be either maintained or increased when the drive train is operating in an overrun mode; and the fourth gradient range is defined as a range of road incline grades in which the target speed is able to be either achieved or increased when the drive train is operating in a coasting mode.

8. The control system according to claim 7, wherein a computer program product operates the cruise control system of the motor vehicle according to the method in which control commands of the computer program product implement steps of:

segmenting the gradient profile of the stretch of road ahead into the profile segments, dividing the gradient profile into the gradient ranges, determining the gradient ranges as a function of the target speed, and selecting the control variant based on the gradient range of at current sequential segment of the gradient profile of the stretch of road ahead.

9. The control system according to claim 8, wherein the computer program product is stored on a data carrier.

* * * * *